(12) United States Patent
Luten, III

(10) Patent No.: US 7,138,186 B2
(45) Date of Patent: Nov. 21, 2006

(54) HYDROPHOBIC COATINGS AND METHODS

(75) Inventor: Henry A. Luten, III, Ypsilanti, MI (US)

(73) Assignee: Guardian Industries Corp., Auburn Hills, MI (US)

(*) Notice: Subject to any disclaimer, the term of this patent is extended or adjusted under 35 U.S.C. 154(b) by 334 days.

(21) Appl. No.: 10/771,514

(22) Filed: Feb. 5, 2004

(65) Prior Publication Data

US 2005/0175847 A1   Aug. 11, 2005

(51) Int. Cl.
*B32B 9/04* (2006.01)

(52) U.S. Cl. .............. 428/447; 428/426; 428/428; 428/429; 428/448; 427/249.15; 427/255.15; 427/255.17

(58) Field of Classification Search ............. None
See application file for complete search history.

(56) References Cited

U.S. PATENT DOCUMENTS

| | | | |
|---|---|---|---|
| 4,263,350 A | 4/1981 | Valimont | |
| 4,272,856 A | 6/1981 | Wegener et al. | |
| 5,328,768 A | 7/1994 | Goodwin | 428/428 |
| 5,372,851 A | 12/1994 | Ogawa et al. | |
| 5,380,585 A | 1/1995 | Ogawa et al. | 428/333 |
| 5,580,605 A | 12/1996 | Ogawa et al. | |
| 5,665,424 A | 9/1997 | Sherman | |
| 5,723,172 A | 3/1998 | Sherman | |
| 6,743,516 B1 * | 6/2004 | Murphy et al. | 428/447 |

FOREIGN PATENT DOCUMENTS

| | | |
|---|---|---|
| WO | WO 00/25938 | 5/2000 |
| WO | WO 2004/009505 A1 | 1/2004 |

OTHER PUBLICATIONS

U.S. Appl. No. 09/921,303, filed Aug. 3, 2001.

* cited by examiner

*Primary Examiner*—Marc S. Zimmer
(74) *Attorney, Agent, or Firm*—Nixon & Vanderhye, P.C.

(57) ABSTRACT

Substrates have a hydrophobic surface coating comprised of the reaction products of methyltrichlorsilane (MTCS) and dimethyldichlorosilane (DMDCS). Most preferably the substrate is glass. An anchor layer is most preferably formed directly onto the glass substrate surface by means of the application of a humidified reaction product of silicon tetrachloride, followed by the vapor-deposition of MTCS as a cross-linking layer. The hydrophobic layer of MTCS and DMDCS may then be applied over the cross-linking layer of MTCS. A capping layer formed of trimethylchlorosilane (TMCS) may then be vapor deposited onto the hydrophobic layer.

14 Claims, 6 Drawing Sheets

HYDROPHOBIC COATINGS AND METHODS

CROSS-REFERENCE TO RELATED APPLICATION

The present application may be deemed to be related to copending U.S. patent application Ser. No. 09/921,303 filed on Aug. 3, 2001, the entire content of which is expressly incorporated hereinto by reference.

FIELD OF THE INVENTION

The present invention relates generally to coated substrates and methods of coating the same. In preferred embodiments, the present invention relates to transparent substrates having a hydrophobic (water repellant) coating thereon.

BACKGROUND AND SUMMARY OF THE INVENTION

Glass is typically made of silicates that are melted to form a clear, transparent, solid material. The fundamental molecular structural unit of conventional glass is a $SiO_4^{4-}$ tetrahedron. Ordinary float glass (named for its production process whereby a molten ribbon of glass is floated on molten metal to provide a smooth surface) includes additional amounts of soda ($Na_2O$), usually in the form of sodium carbonate or nitrate during the production process, lime (CaO) and other oxides (usually aluminum and magnesium oxides) to form a soda-lime-silica structure known colloquially as soda-lime glass. Other specialized glass can be prepared by the introduction of other additives and constituents.

It is sometimes highly desirable for conventional glass to have hydrophobic (water repellant) surface properties when employed in certain end-use applications, such as for automotive window glass. Various proposals exist to impart hydrophobic (water-repellant) properties to glass substrates. For example, U.S. Pat. Nos. 4,263,350, 4,274,856, 5,665,424 and 5,723,172 (the entire content of each being incorporated expressly hereinto by reference) disclose generally that glass surfaces can be coated with a vapor deposited layer of an chloroalkylsilane, such as dimethyldichlorosilane (DMDCS) so as to improve their hydrophobicity and/or release properties. Other proposals exist whereby a fluoroalkylsilane (FAS) coating may be employed to "cap" an underlayer on a glass substrate so as to improve coating durability. Please see in this regard, U.S. Pat. Nos. 5,328,768, 5,372,851, 5,380,585 and 5,580,605 (the entire content of each being incorporated expressly hereinto by reference). In addition, International Application WO 00/25938 (the entire content of which is expressly incorporated hereinto by reference) discloses that a silicon film consisting of chains of siloxane groups each terminating in an end molecule which reacts with water to form an OH group, may be capped by further reaction of that OH group with trimethylchlorosilane to form trimethylchlorosiloxane.

In commonly owned, U.S. patent application Ser. No. 09/921,303, filed on Feb. 1, 2001 (the entire content of which is expressly incorporated hereinto by reference) there are disclosed coated substrates (preferably glass) and methods which exhibit improved hydrophobicity and durability. In some of the especially preferred embodiments disclosed therein, coated substrates and methods are provided which include a $SiO_x$-containing anchor layer comprised of a controllably humidified vapor phase deposition of a chlorosilyl group containing compound (typically silicone tetrachloride), and a hydrophobic capping layer chemically bonded to the $SiO_x$-containing anchor layer.

It has now been discovered that certain performance enhancements, such as enhanced chemical and weather resistance, may ensue by the vapor deposition of methyltrichlorosilane over a $SiO_x$-containing anchor layer on transparent substrates (e.g., glass) so as to form a film of polymethylsilsesquioxane thereon.

Specifically, in accordance with the present invention, substrates are provided which have a hydrophobic surface coating comprised of the reaction products of methyltrichlorsilane (MTCS) and dimethyldichlorosilane (DMDCS). Most preferably the substrate is glass. An anchor layer is most preferably formed directly onto the glass substrate surface by means of the application of a humidified reaction product of silicon tetrachloride, followed by the vapor-deposition of MTCS as a cross-linking layer. The hydrophobic layer of MTCS and DMDCS may then be applied over the cross-linking layer of MTCS. A capping layer formed of trimethylchlorosilane (TMCS) may then be vapor deposited onto the hydrophobic layer.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawing FIGURES, wherein

DETAILED DESCRIPTION OF THE INVENTION

Figure 1:
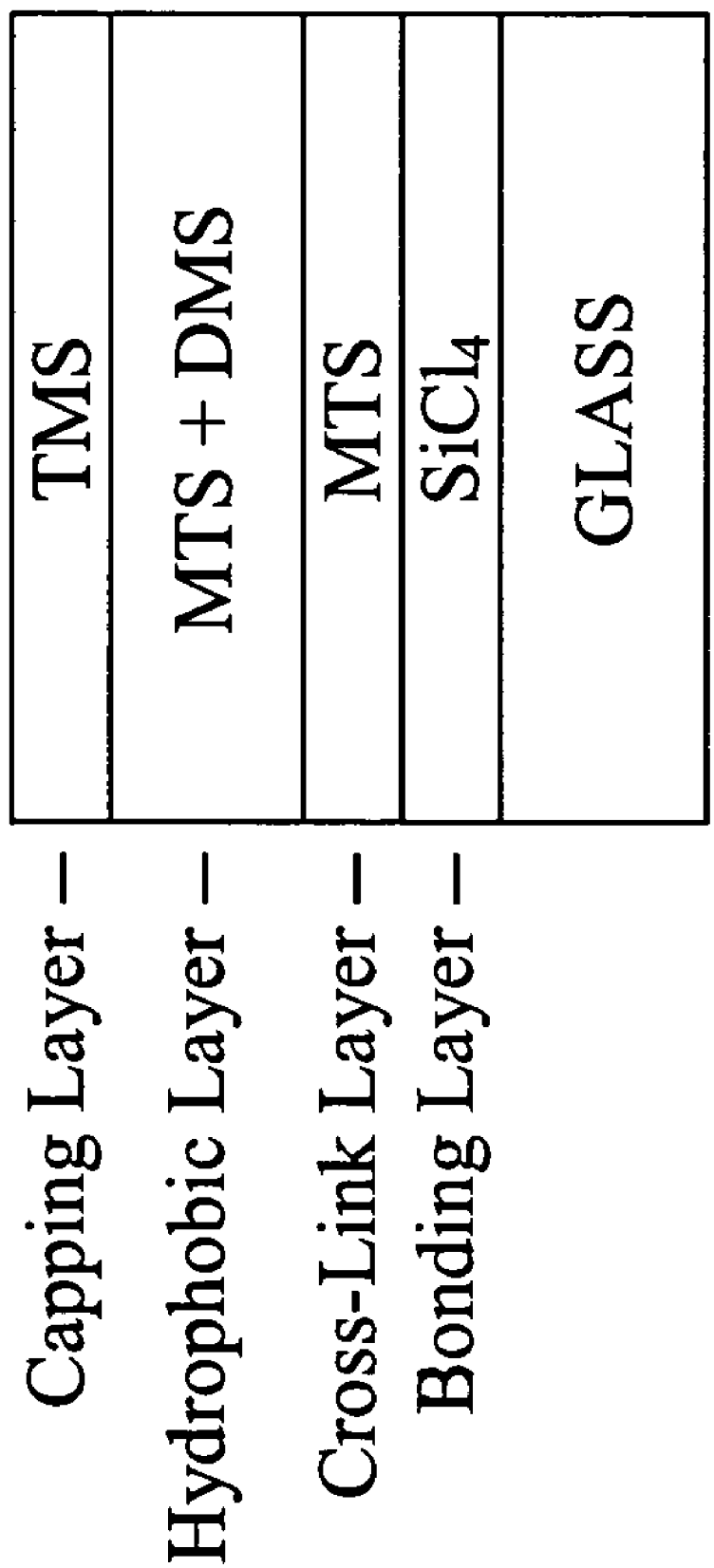
FIG. 1 is a schematic depiction of an exemplary coated glass substrate in accordance with the present invention.

Virtually any substrate that is self-supporting and has, or may be induced to have, active surface hydrogen atoms may be coated in accordance with the present invention. Thus, rigid or flexible substrates formed of glass, plastics, ceramics and the like may be coated in accordance with the present invention. Most preferably, the substrate is glass, with conventional soda-lime float glass being especially preferred.

In one particularly preferred coating in accordance with the present invention, an anchor layer comprised of a silicon oxide ($SiO_x$) is formed by vapor-deposition of a silicon-oxide forming compound onto the substrate in a controllably humidified environment. In especially preferred forms of the invention, the silicon oxide layer may be obtained by the reaction of a compound having a chlorosilyl group. Most preferably the compound is silicon tetrachloride ($SiCl_4$) which reacts with the surface of the glass to form an underlayer containing $SiO_2$. Other silanes that form silicon oxide may optionally, or additionally, be employed, such as hexachlorodisiloxane. When using silicon tetrachloride, it has been found that diluting 1 part of silicone tetrachloride with 10 parts pentane is particularly effective.

According to the present invention, methyltrichlorosilane (MTCS) is vapor deposited onto the silicon oxide anchor layer to form a film of a cross-linking layer which consists essentially of polymethylsilsesquioxane (PMSO) thereon. The subsequent simultaneous vapor deposition of MTCS and dimethyldicholorsilane (DMDCS) may then be applied onto the MTCS layer to form a hydrophobic layer consisting essentially of cross-linked polydimethylsiloxane (PDMSO) wherein the MTCS serves as the cross-linking agent. MTCS and DMDCS are most preferably simultaneously vapor deposited in a volume ratio of MTCS to DMDCS of between about 0.15:1 to about 1.75:1, more preferably between about 0.75:1 to about 1.25:1.

The cross-linked PDMSO layer may optionally be over-coated (or capped) with an alkyl silane capping layer. In this regard, virtually any suitable alkyl silane may be employed to form a capping layer in accordance with the present invention, such as those described in the above-cited U.S. Pat. Nos. 5,328,768, 5,372,851, 5,380,585 and 5,580,605. For example, the capping layer may be formed by the vapor phase deposition of at least one alkylchlorofluorosilane selected from the group consisting of $CF_3(CF_2)_5(CH_2)_2SiCl(CH_3)_2$ and $(CF_3)_2FC-O(CH_2)_3SiCl_2CH_3$.

The humidity during vapor-phase deposition of the silicon oxide anchor layer is important to achieve the desired end result of a durable hydrophobic coating on the substrate. In addition, controlled humidity during vapor phase deposition of the silicon oxide layer is important to achieve a coating with low haze characteristics. Preferably, the humidity during vapor phase deposition of the silicon oxide anchor layer from silicon tetrachloride should be less than about 50% relative humidity, and advantageously less than about 45% relative. Preferably the relative humidity within the chamber is controlled to be about 40% or less. The silicon oxide layer will most preferably exhibit haze (non-specular light scattering) of less than about 3.0%, and typically less than about 2.0%. Advantageously, the haze of the silicon oxide layer will be less than about 1.5%, particularly less than about 0.8%.

The coated substrates of the present invention will exhibit a tilt angle (30 μL droplet size) of about 35° or less, and typically 30° or less. For some embodiments of the present invention, extremely low tilt angles of about 20° or less, or even about 10° or less, are obtainable. The coatings of the present invention are also highly durable. That is, the coated substrates of the present invention will exhibit a contact angle after 300 Taber abrasion cycles of greater than about 65°, and typically greater than about 70°. Even after 1000 Taber cycles, the coated substrates of the present invention will exhibit a contact angle of greater than about 60°, usually between about 65° to about 75°.

The coated substrates of the present invention can be conveniently produced using a closed reaction chamber configured to have an inlet opening for the chemical vapors, and a discharge opening to allow the chamber to be exhausted. The substrates are cleaned thoroughly and rinsed prior to being placed in the reaction chamber. The humidity within the chamber is controlled by the introduction of water vapor in dependence upon the chemical vapors being deposited. Thus, humidity within the reaction chamber of greater than about 10%, and less than about 80% are typically employed. The reaction chamber is most preferably maintained under ambient temperature (20° C.–25° C.) and atmospheric pressure (about 1.0 atmosphere) conditions during the vapor deposition of the underlayer and capping layer.

The present invention will be further understood by reference to the following non-limiting Examples.

EXAMPLES

Glass substrates were cleaned and then placed into the reaction chamber, aligned parallel to the gas flow. Humid air was produced by bubbling air through water kept at a substantially constant temperature of 40° C. The humidity level in the chamber was maintained substantially constant by admixing dry air. Reaction precursors were introduced in a similar manner, that is, by flowing dry air over the precursor liquid and into the chamber. After the process was complete, unreacted vapors were exhausted from reaction chamber for a minimum of 5 minutes prior to removal of the coated substrates.

Substrates in accordance with the present invention were made having the layer structure as shown in FIG. 1 and designated RB-II. As comparison, a coated substrate in accordance with U.S. application Ser. No. 09/921,303 filed on Aug. 3, 2001 was made having vapor deposited layers in the following order from the surface of the glass substrate outward: a silicon oxide anchor layer obtained by the vapor deposition of silicon tetrachloride; a cross-link layer formed of vapor-deposited DMDCS and 9% silicon tetrachloride; a hydrophobic layer formed of vapor deposited DMDCS and a capping layer of TMCS. Such a coated substrate was identified as RB-I.

As further comparison, commercially available glass treatments were also tested including RAIN-X® windshield coating from Blue Coral, Inc. (identified hereinafter as sample "RX"); AutoVision® windshield coating from Daytona Brands, Inc. (identified hereinafter as sample "AV"); AQUAPEL® glass treatment from PPG (identified hereinafter as sample "AQP"); and CASCADA™ BLUE windshield coating from Cascada Coatings NV (hereinafter identified as sample "CB").

The substrate samples were evaluated using the following test methods and techniques:

Contact Angle: Contact angle was measured at various locations on the coated substrate. The recorded value represented the average value of all measured readings.

Abrasion Resistance: The abrasion resistance was evaluated on the basis of contact angle change at the abrasion location. The coating was Taber-abraded using CS-10F wheels and 500 g load. The CF-10F wheels were resurfaced prior to each abrasion test (25 cycles with resurfacing stone). After 300 cycles, the substrate was removed from abrader and cleaned. The Taber track was cleaned by immersing the substrate in warm distilled water (40–45C) for 5–10 seconds. The Taber track was wiped with clean Preference brand paper towels. The substrate was thereafter rinsed with room temperature distilled water. The surface to be tested was dried with compressed air. After the contact angle measurement, the substrate was abraded for an additional 700 cycles. The substrates were cleaned as before and the contact angle was again measured. The results of this testing are graphically presented in FIG. 2.

Tilt Angle: The coated substrate was placed on an instrument that was able to tilt and record the angle of such tilt. A 30 micro liter drop of distilled water was gently placed on the surface to be tested at an initial tilt angle of 0. The angle at which the surface was tilted was increased periodically at 1° increments until the drop of water flowed across the surface. The angle of the surface at that time was then recorded as the tilt angle. The results of this testing are graphically presented in FIG. 3.

Figure 4:
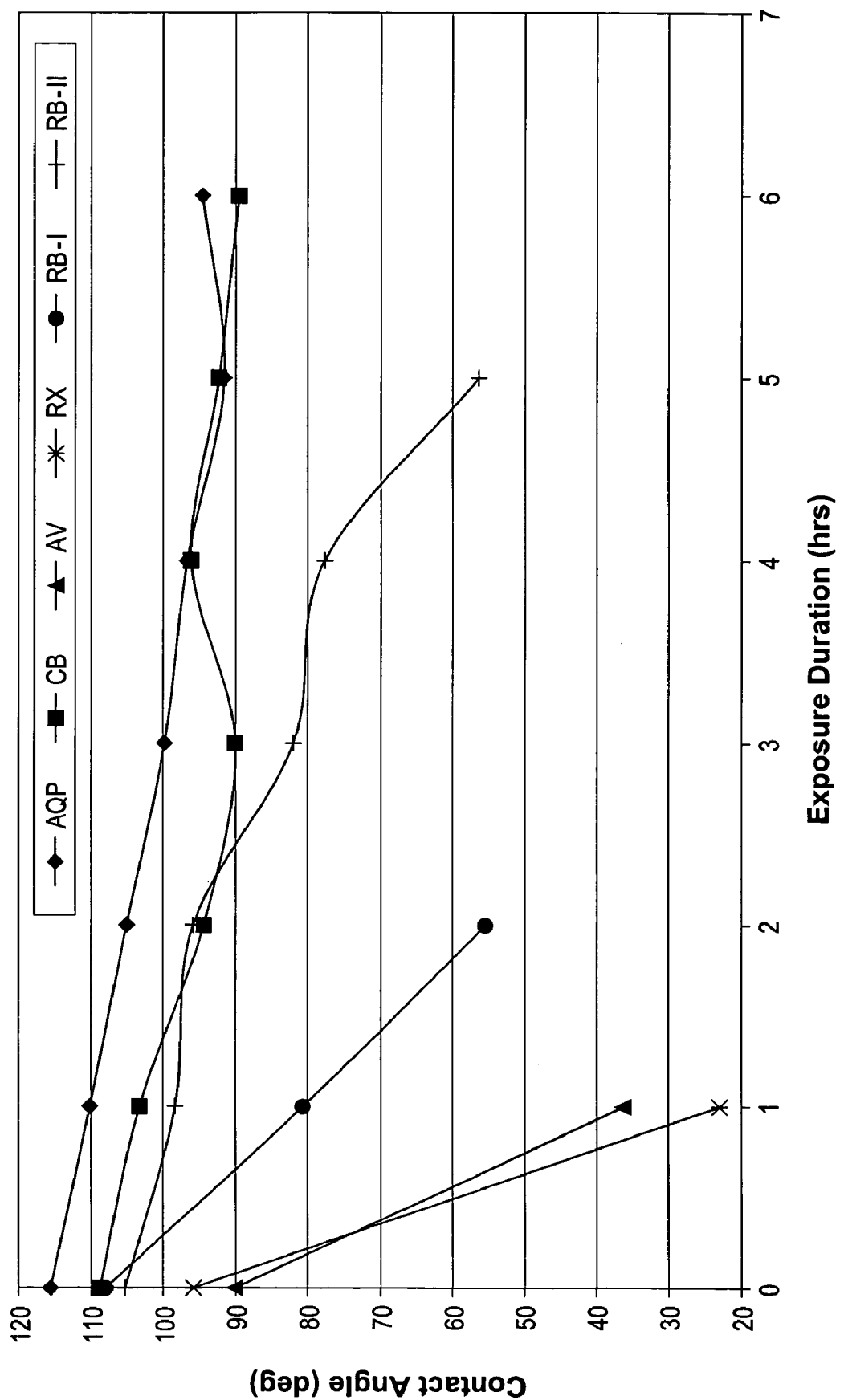
FIG. 4 is a graph of the contact angles versus exposure time (hours) in a 1% NaOH solution (pH approx. 13.4) for several coated substrates that were tested in the Examples below.

Base Resistance: Subsequent to having their contact angles measured, the coated glass samples were placed in a 1% NaOH solution (pH approx. 13.4) asnd allowed to soak at room temperature for one hour. The samples were then removed from the solution and rinsed thoroughly with tap water and dried. The contact angle was then remeasured and the samples were placed back into the 1% NaOH solution for another hour. This was repeated for each sample until the recorded contact angle was less than 70 degrees. The results of this testing are graphically presented in FIG. 4.

Figure 5:
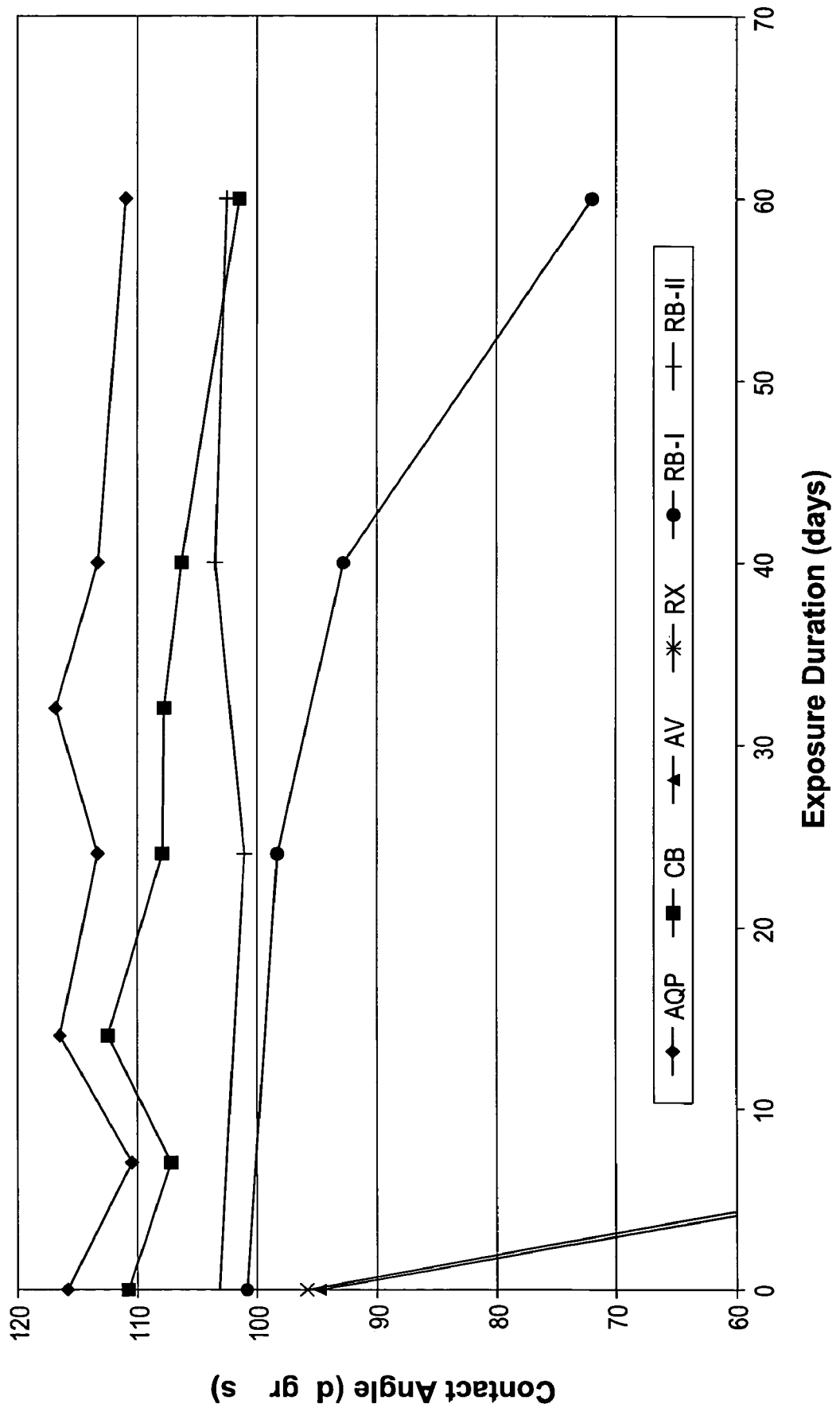
FIG. 5 is a graph of the contact angle versus exposure duration (days) in a weatherometer (WOM) system for several coated substrates that were tested in the Examples below.

UV-Humidity Weather Resistance: Degradation of hydrophobic coatings by the combination of ultraviolet radiation and humidity was simulated by exposure in a Weatherometer (WOM) system. The WOM system combined cycles of condensing humidity with exposure to UV radiation from a Xenon arc that was filtered to reproduce the energy distribution of solar radiation. As was the case for the base soak, degradation was monitored by decay of the contact angle. The results of this testing are graphically presented in FIG. 5.

Figure 6:
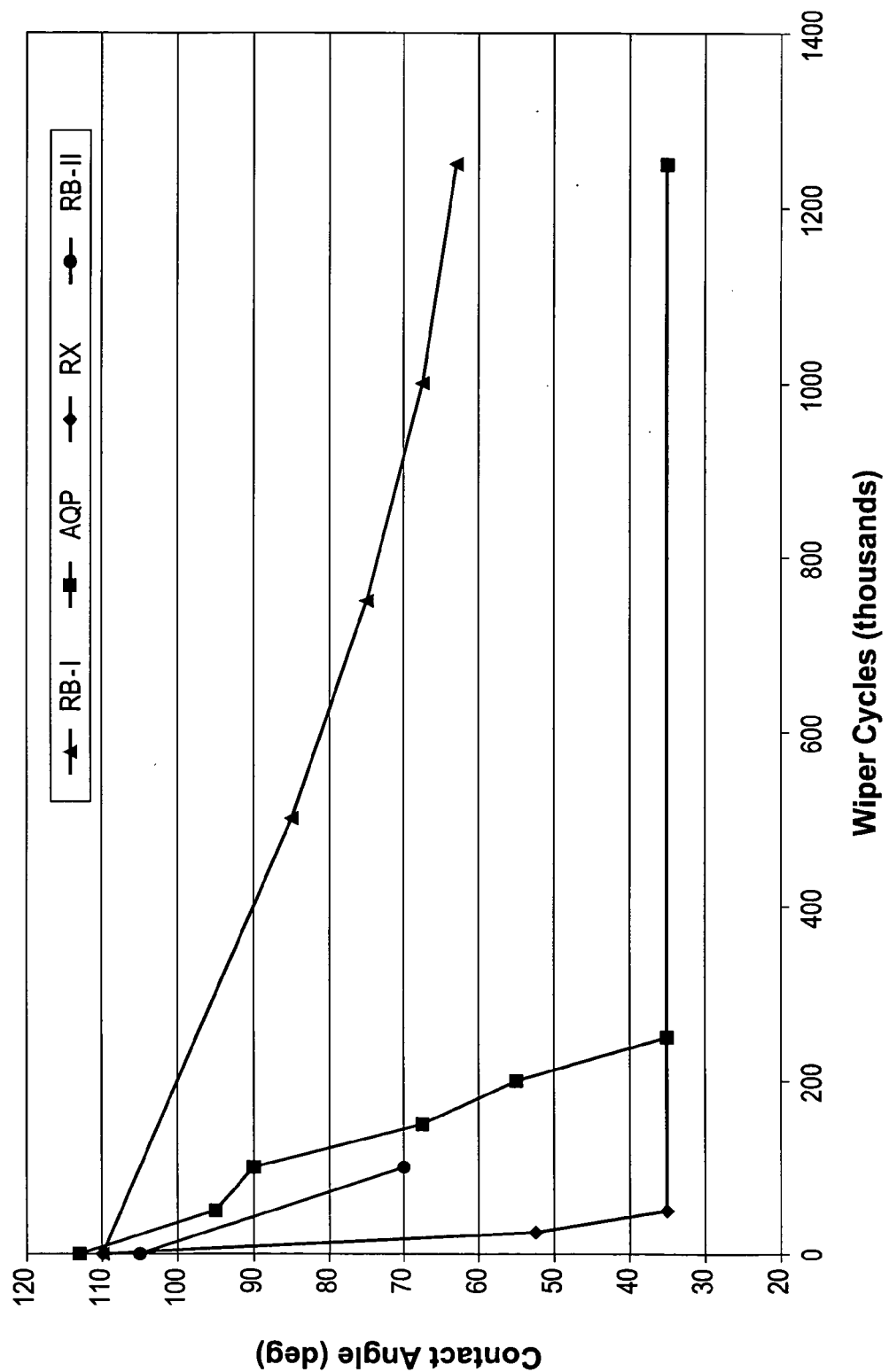
FIG. 6 is a graph of the contact angle versus wiper cycles for several coated substrated in accordance with the Examples below.

Wiper Testing: Windshields coated with the RB-I, RB-II, RX and AQP coatings were subjected to windshield wiper abrasion testing wherein the average contact angle in the wiped areas was used as the measure of degradation. The results of this testing are graphically presented in FIG. 6.

Figure 2:
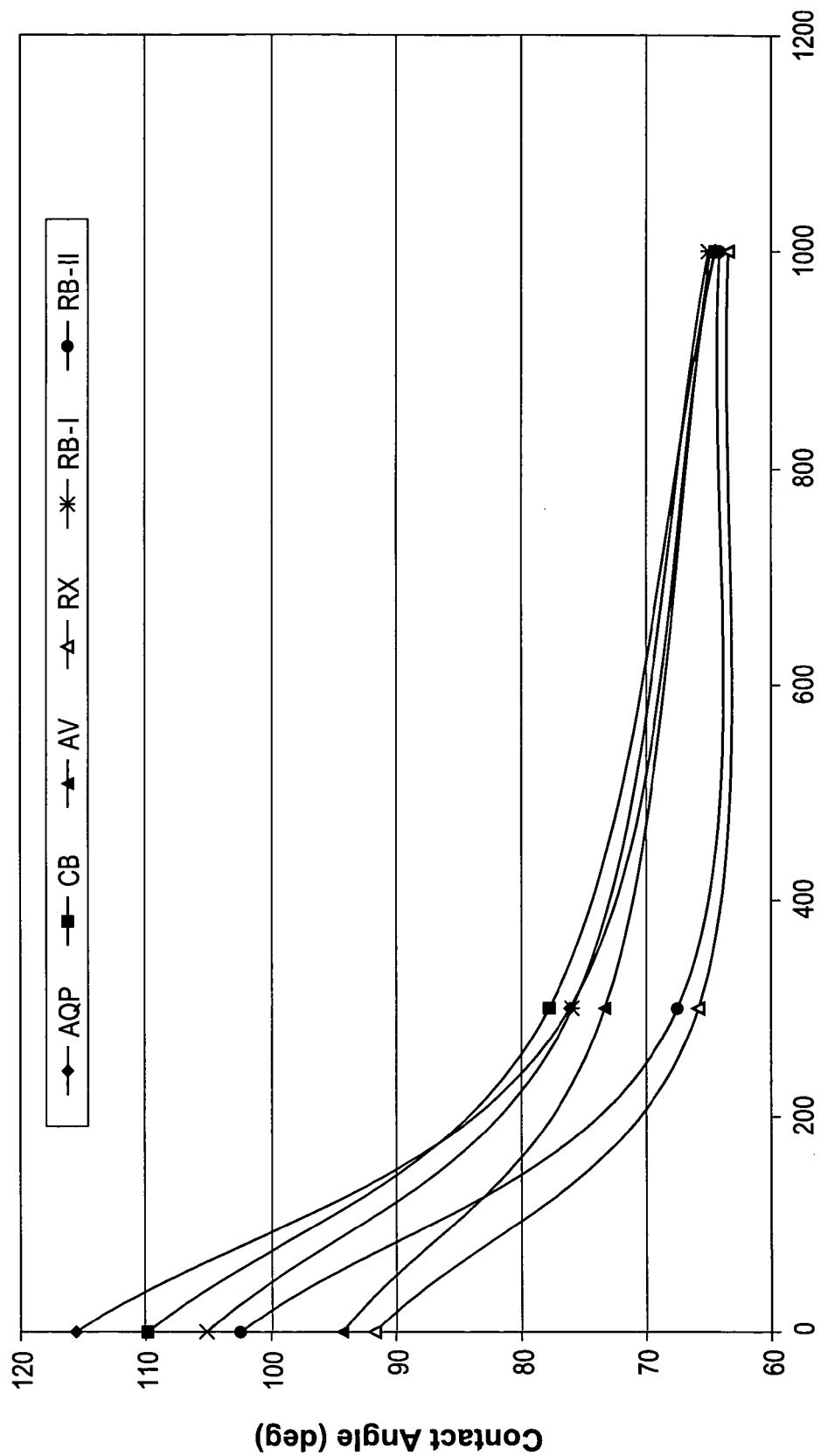
FIG. 2 is a graph of the contact angles versus Taber cycles for several coated substrates that were tested in the Examples below.
Figure 3:
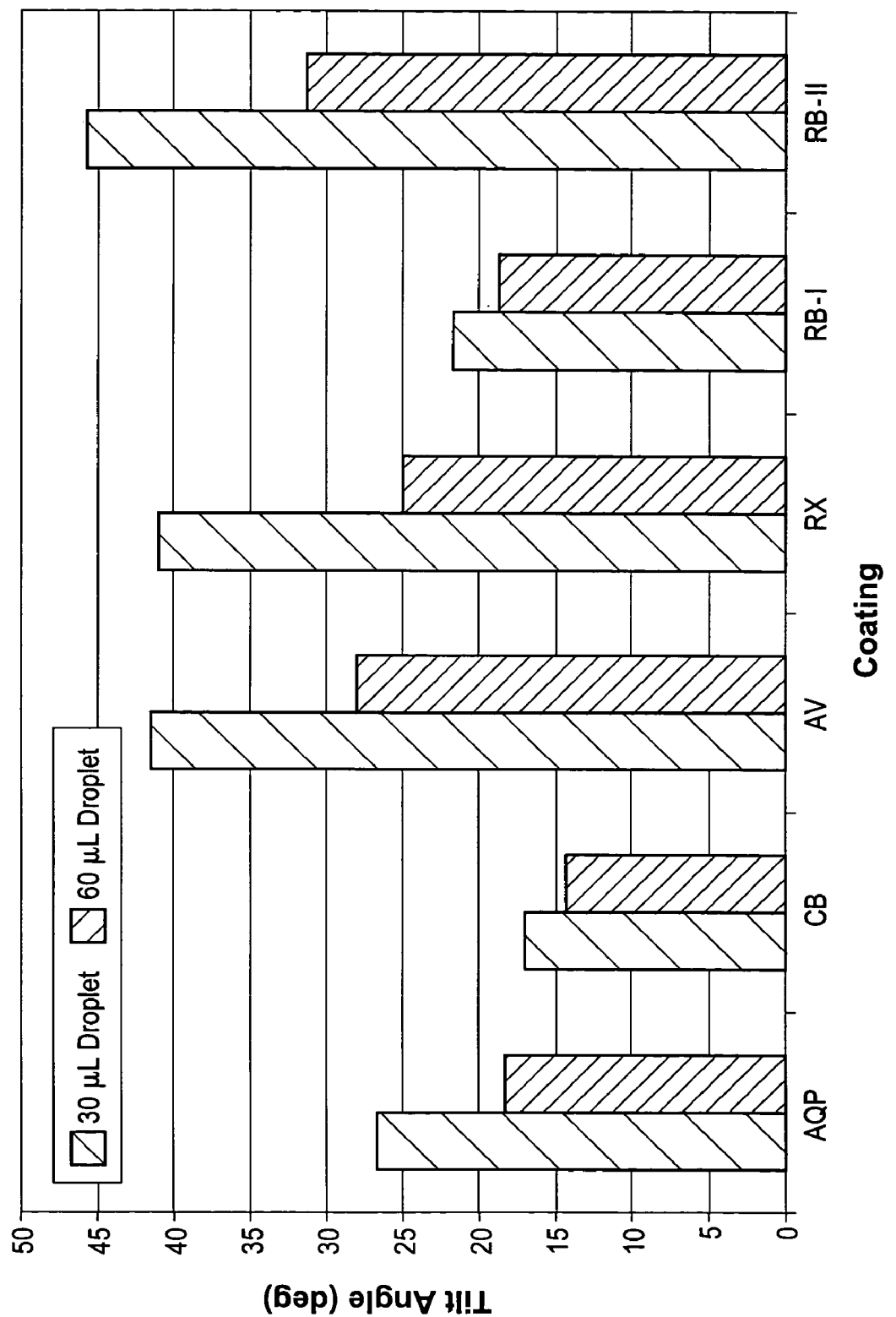
FIG. 3 is a graph of the tilt angles of 30 µL and 60 µL droplets for several coated substrates that were tested in the Examples below.

As can be seen from FIG. 2, every coating that was tested trended toward a contact angle of about 60 degrees after 1000 Taber cycles. The tilt angles for both 30 μL and 60 μL droplets shown in FIG. 3 is less than optimum for the RB-II coating in accordance with the present invention as compared to the RB-I coating, but shows in substantial improvements in terms of both chemcial (base) resistance and weather resistance properties (see FIGS. 3 and 4, respectively). Less than optimum results were achieved, however, for RB-II in the wiper tests as the coated sample fell to a contact angle of below 70 degrees after only 100 k wiper cycles. However, the data obtained in the tests reveal that the hydrophobic coatings obtained according to the present invention are advantageous in a number of important criteria.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A substrate having a hydrophobic surface coating comprised of a silicon oxide anchor layer, a hydrophobic layer and a cross-linking layer between the anchor layer and the hydrophobic layer, wherein the hydrophobic layer consists essentially of the humidified simultaneous vapor deposited reaction product of methyltrichlorosilane (MTCS) and dimethyldichlorsilane (DMDCS), and wherein the cross-linking layer consists essentially of the humidified vapor-deposited reaction product of MTCS.

2. The substrate of claim 1, further comprising a capping layer which covers the hydrophobic layer and which consists essentially of the humidified vapor deposited reaction product of trimethylchlorosilane (TMCS).

3. The substrate of claim 1, wherein the humidified vapor-deposited reaction product of MTCS of the cross-linking layer consists essentially of polymethylsilsesquioxane (PMSO), and wherein the humidified simultaneous vapor deposited reaction product of MTCS and DMDCS of the hydrophobic layer is cross-linked polydimethylsiloxane (PMDSO).

4. The substrate of claim 1, wherein the anchor layer exhibits a haze value of less than about 3.0%.

5. The substrate of claim 4, wherein the anchor layer exhibits a haze value of less than about 2.0%.

6. The substrate of claim 5, wherein the anchor layer exhibits a haze value of less than about 1.5%.

7. The substrate of claim 1, wherein the volume ratio of MTCS to DMDCS in the hydrophobic layer is between about 0.15:1 to about 1.75:1.

8. The substrate of claim 7, wherein the volume ratio of MTCS to DMDCS in the hydrophobic layer is between about 0.75:1 to about 1.25:1.

9. A process for forming a hydrophobic coating on a glass substrate comprising the steps of:
    (a) forming an anchor layer by contacting a surface of the substrate to be coated with a silicon tetrachloride vapor for a time sufficient to form a silicon oxide layer on the glass surface;
    (b) forming a cross-linking layer over the silicon oxide layer by the humidified vapor deposition of methyltrichlorosilane (MTCS);
    (c) forming a hydrophobic layer over the cross-linking layer by the simultaneous vapor deposition of MTCS and dimethyldichlorosilane (DMDCS) for a time sufficient to form a cross-linked layer of polydimethylsiloxane (PDMSO).

10. The process of claim 9, wherein the volume ratio of MTCS to DMDCS is between about 0.15:1 to about 1.75 :1.

11. The process of claim 10, wherein the volume ratio of MTCS to DMDCS is between about 0.75:1 to about 1.25: 1.

12. The process of claim 9, which further comprising the step of vapor depositing a chloroalkylsilane capping layer over the hydrophobic layer.

13. The process of claim 12, wherein the chloroalkylsilane capping layer consists essentially of trimethylchlorosilane (TMCS).

14. A coated glass substrate made by the process of claim 9, 10, 11, 12 or 13.

* * * * *